United States Patent
Kargl et al.

(10) Patent No.: US 7,912,430 B2
(45) Date of Patent: Mar. 22, 2011

(54) CIRCUIT ARRANGEMENT FOR WIRELESSLY EXCHANGING DATA AND RFID CHIP CARD DEVICE

(75) Inventors: Walter Kargl, Graz (AT); Richard Sbuell, Graz (AT)

(73) Assignee: Infineon Technologies AG (DE)

( * ) Notice: Subject to any disclaimer, the term of this patent is extended or adjusted under 35 U.S.C. 154(b) by 1030 days.

(21) Appl. No.: 11/670,855

(22) Filed: Feb. 2, 2007

(65) Prior Publication Data
US 2008/0087723 A1 Apr. 17, 2008

(30) Foreign Application Priority Data
Oct. 13, 2006 (DE) .................. 10 2006 048 594

(51) Int. Cl.
*H04B 1/04* (2006.01)

(52) U.S. Cl. ........ 455/126; 455/41.1; 455/41.2; 330/85; 330/2; 330/140; 330/129; 330/51; 363/16; 363/89; 363/70; 363/81; 363/125; 235/435; 340/10.34; 323/234

(58) Field of Classification Search .............. 455/41.2, 455/41.1, 126; 235/435; 363/16, 89, 70, 363/81, 125, 84; 340/10.34; 323/234; 330/85, 330/2, 140, 129, 141, 51
See application file for complete search history.

(56) References Cited

U.S. PATENT DOCUMENTS

| | | | | |
|---|---|---|---|---|
| 6,134,130 A * | 10/2000 | Connell et al. | .................. | 363/89 |
| 6,208,205 B1 * | 3/2001 | Main et al. | ...................... | 330/98 |
| 6,343,022 B1 * | 1/2002 | Naruse | ............................ | 363/16 |
| 6,547,786 B1 * | 4/2003 | Goble | .............................. | 606/34 |
| 6,628,165 B1 * | 9/2003 | Henderson et al. | ............. | 330/85 |
| 7,575,165 B2 * | 8/2009 | Villard et al. | ................. | 235/435 |
| 2005/0156710 A1 * | 7/2005 | Kranabenter | .............. | 340/10.34 |

FOREIGN PATENT DOCUMENTS
EP 1089217 4/2001

* cited by examiner

*Primary Examiner* — Matthew D Anderson
*Assistant Examiner* — April G Gonzales
(74) *Attorney, Agent, or Firm* — Dickstein Shapiro LLP

(57) ABSTRACT

A circuit arrangement for wirelessly exchanging data with a reader device, including an antenna for converting electromagnetic radiation into an antenna voltage, an analogue circuit for demodulating an information signal based on the antenna voltage, and a digital circuit for processing of the information signal and for receiving power from the analogue circuit. The circuit arrangement also includes a decoupling circuit, which is interconnected between the analogue circuit and the digital circuit and provides a decoupling of both circuits.

25 Claims, 7 Drawing Sheets

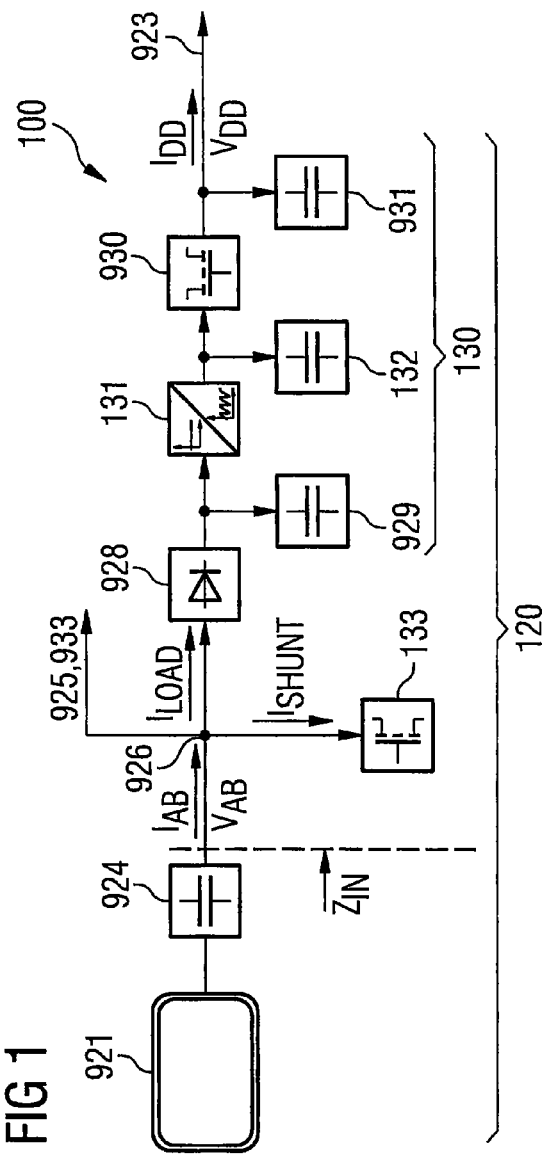
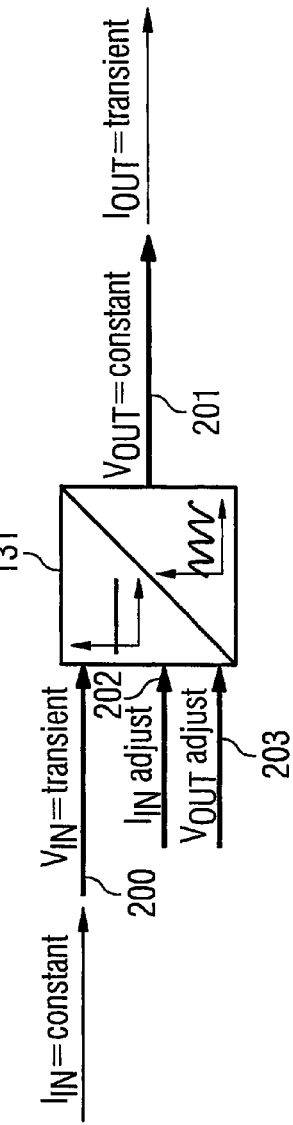

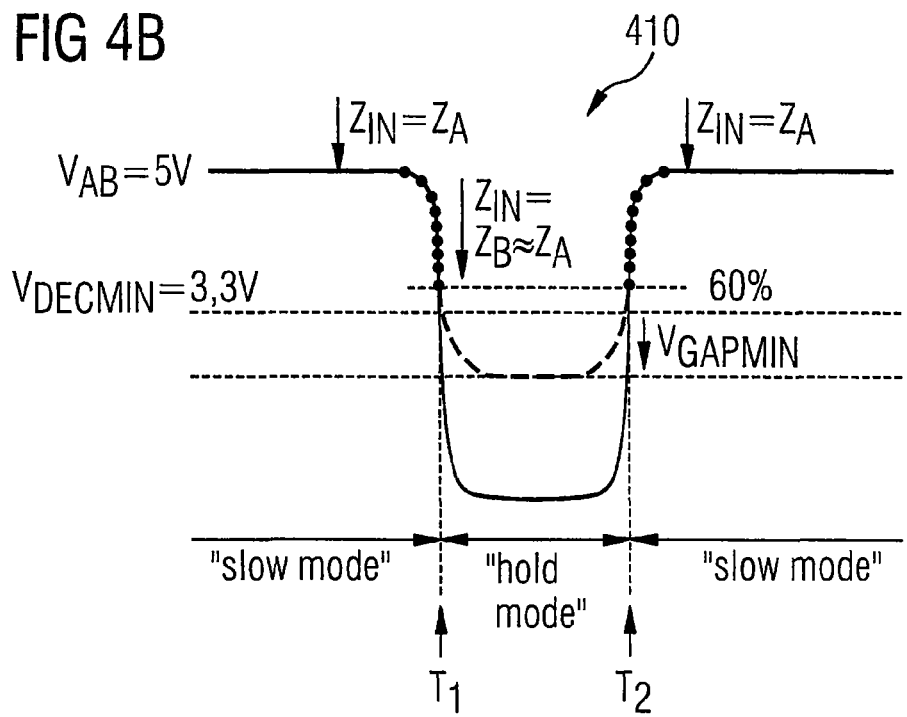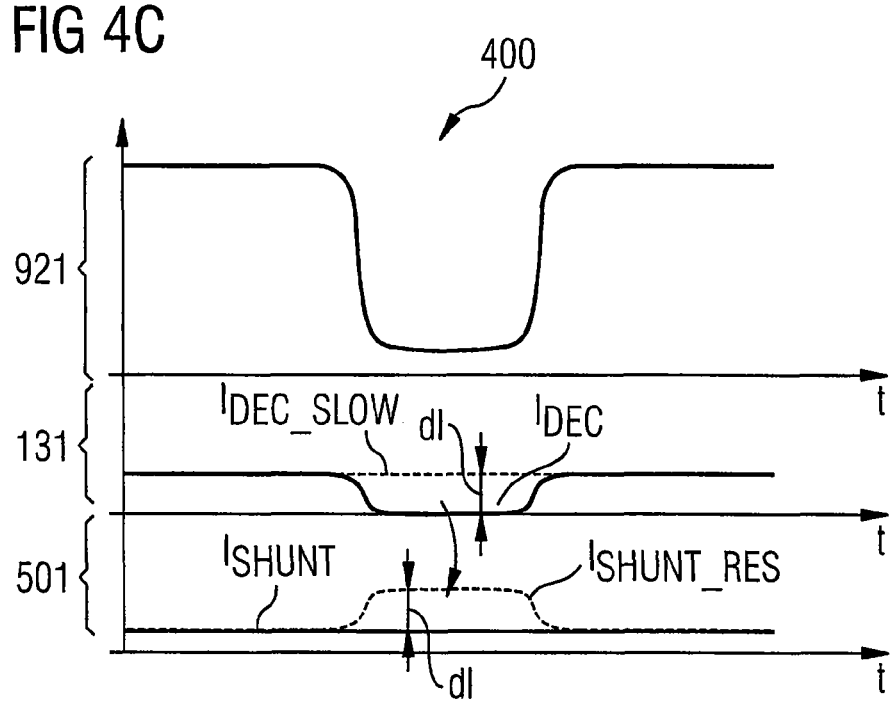

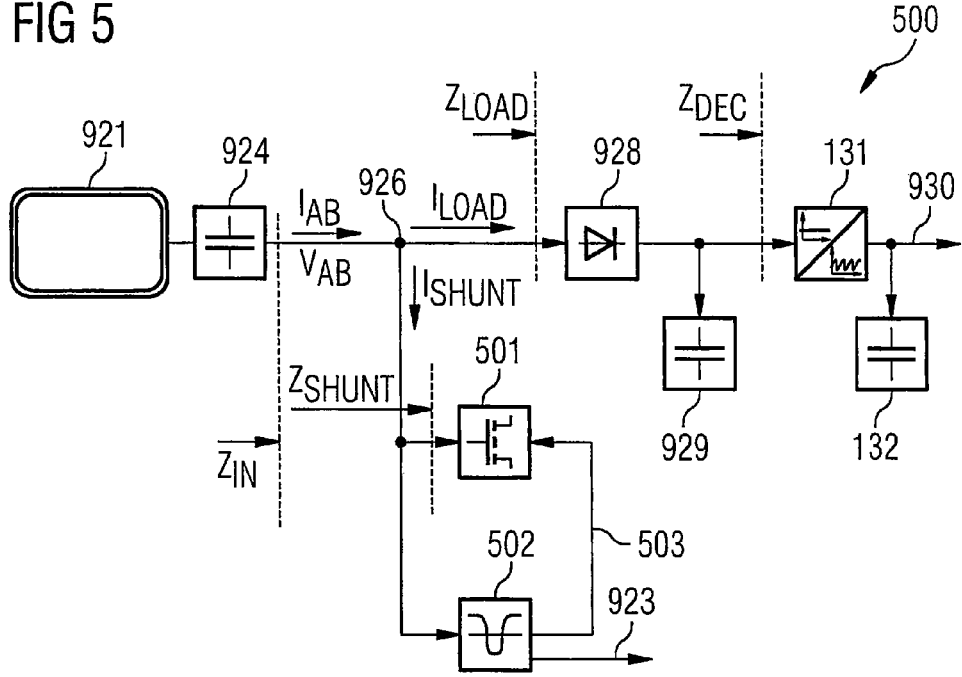
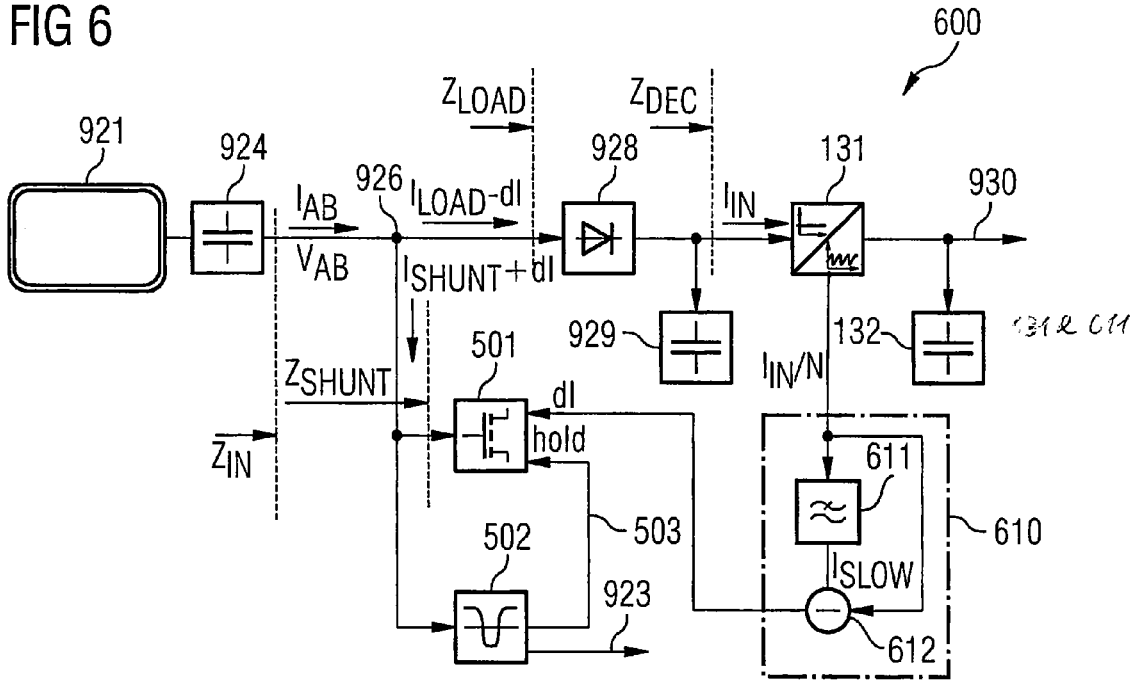

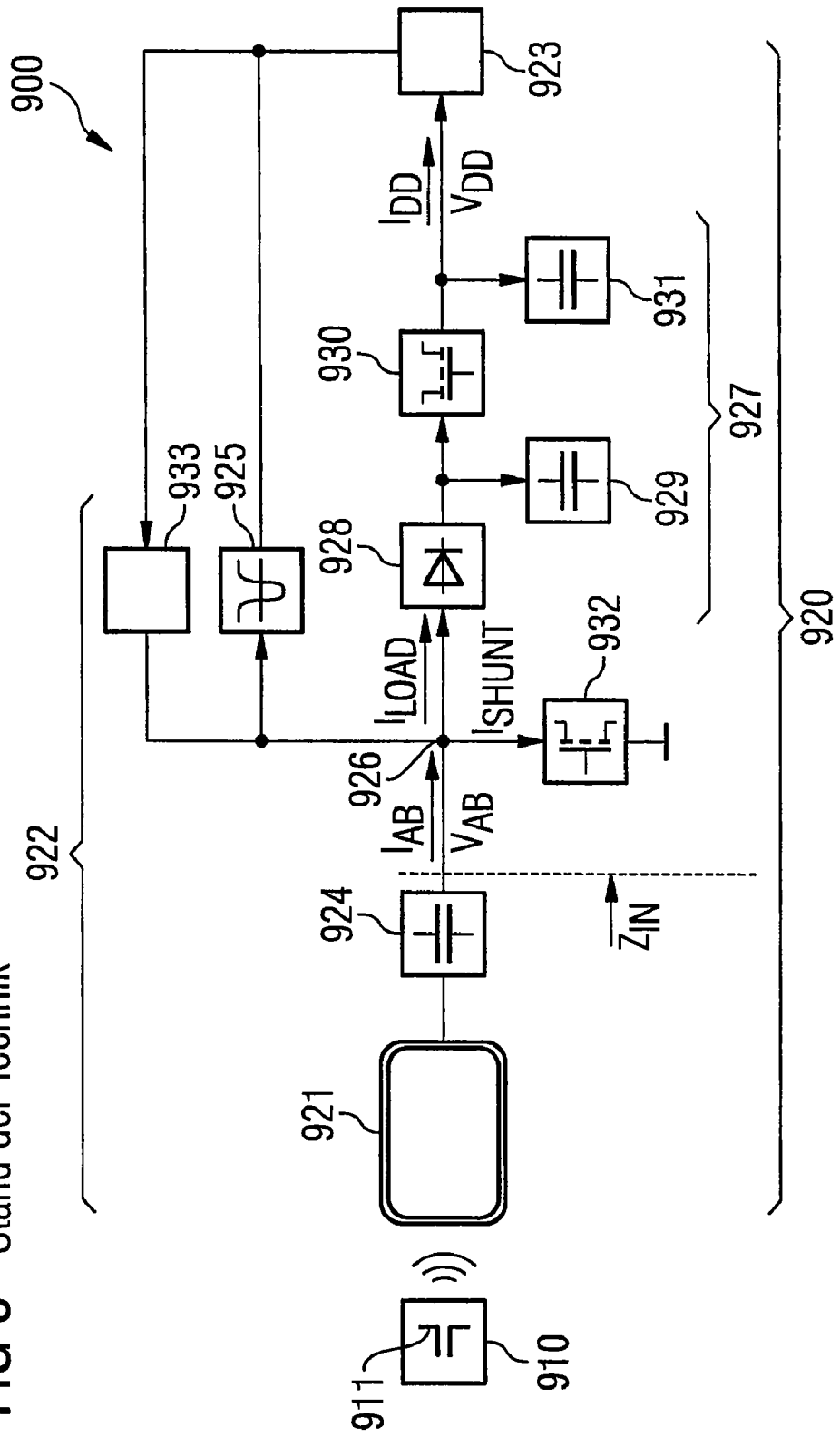
FIG 9  Stand der Technik

US 7,912,430 B2

CIRCUIT ARRANGEMENT FOR WIRELESSLY EXCHANGING DATA AND RFID CHIP CARD DEVICE

CROSS-REFERENCE TO RELATED APPLICATION

This application claims priority to German Patent Application Serial No. 102006048594.7, which was filed Oct. 13, 2006, and is incorporated herein by reference in its entirety.

BACKGROUND OF THE INVENTION

The invention relates to a circuit arrangement for wirelessly exchanging data with a reader device, comprising an antenna for converting electromagnetic radiation into an antenna voltage, an analogue circuit for demodulating of an information signal based on the antenna voltage, a digital circuit for processing of the information signal, and a decoupling circuit interconnecting the analogue circuit and the digital circuit. The invention also relates to RFID chip card devices.

So-called RFID chip cards comprise antennas, whose antenna voltage serve two purposes, for transmitting data between a reader device and the RFID card, and for supplying energy to further components of the RFID card.

Because contactless chip cards do not comprise a power supply unit of their own, they can be manufactured particularly cheap and are thus suited for a variety of applications. Systems, which require the use of a multiplicity of chip cards, for example for the identification of deliveries or products or as a means of controlling access, can be implemented particularly economically using contactless chip cards. At the same time, contactless chip cards allow a particular easy exchange of data with a reader device.

Because contactless chip cards can be read out unnoticed, security issues may arise. In particular, in access control systems, security and data protection aspects are gaining importance. In order to improve data protection, more and more data stored on a contactless chip card and data transferred from and to a contactless chip card is encrypted. The encryption and decryption is performed by a processor comprised in the contactless chip card.

Because cryptographic algorithms are particularly complex to compute, the current input is changing more rapidly during their execution than during other operations of digital circuits, for example during storing and retrieval of unencrypted data. A change in the input current of a digital circuit influences electrical variables such as the antenna voltage or impedance of the analogue circuit, such that a reception of data from a reading device may be disturbed.

In order to improve resistance to disturbance, it is known in the art to provide a decoupling circuit between the analogue circuit and the digital circuit. Such a circuit arrangement is known from the U.S. Pat. No. 6,134,130, for example. The circuit arrangement known from the art is designed to keep disturbing signals of the digital circuit away from the analogue circuit.

However, the known circuit arrangement can only ensure the desired decoupling if the antenna voltage exceeds a predefined value. Certain methods of modulation such as the so-called "Type A" transfer mode according to ISO 14443, or particular operating conditions such as large distances between a reading device and a chip card, may result in an antenna voltage too low for ensuring an effective decoupling and simultaneous demodulation of an information signal.

Consequently, it is a challenge to provide a circuit arrangement and an RFID chip card with improved communication capabilities.

BRIEF DESCRIPTION OF THE DRAWINGS

Preferred embodiments of the present invention will be described more closely using the following figures, wherein FIG. 1 shows a schematic diagram in accordance with a first embodiment of a circuit arrangement, FIG. 2 shows a schematic diagram of a decoupling circuit, FIG. 4B shows an antenna voltage during reception of a disturbed gap, FIG. 4C shows a current flow through a decoupling circuit and a shunt, FIG. 5 shows a schematic diagram in accordance with a second embodiment of the circuit arrangement, FIG. 6 shows a schematic diagram in accordance with a third embodiment of the circuit arrangement, FIG. 9 shows a schematic diagram of a circuit arrangement in accordance with the prior art.

DESCRIPTION OF THE INVENTION

Figure 3:
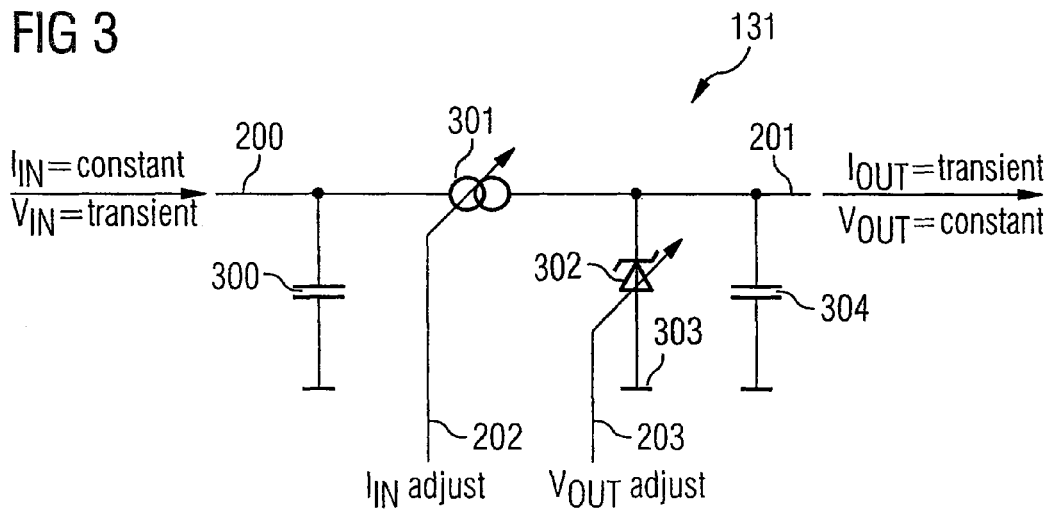
FIG. 3 shows a circuit design of the decoupling circuit according to a first embodiment.

According to a first aspect of the invention, a circuit arrangement for wirelessly exchanging data with a reader device is disclosed. The circuit arrangement comprises:

an antenna for converting electromagnetic radiation into an antenna voltage, an analogue circuit for demodulating an information signal based on the antenna voltage, the analogue circuit comprising an adjustable shunt, a digital circuit for processing the information signal and being adapted to be supplied with power from the analogue circuit, a decoupling circuit, interconnected between the analogue circuit and the digital circuit, and a feedback circuit connected to the decoupling circuit and the adjustable shunt and adapted to detect an amplitude modulation of the antenna voltage, the feedback circuit being adapted to control the adjustable shunt in response to a detected modulation of the antenna voltage.

Due to the feedback circuit for controlling the adjustable shunt, a safe detection of a modulated information signal can be guaranteed in case of an amplitude modulation scheme using a high degree of modulation, even when the resulting antenna voltage drops below a predefined value.

According to an advantageous embodiment of the first aspect, the feedback circuit is adapted to keep constant or decrease the impedance of the adjustable shunt in case a gap is detected in the modulated antenna voltage. Modulation schemes using gaps within the modulated antenna voltage for encoding of information can be used in combination with the feedback circuit if the feedback circuit is adapted to keep constant or decrease the impedance of the adjustable shunt, such that gaps are reliably detected.

According to a second aspect of the invention, a circuit arrangement for wirelessly exchanging data with a reader device is disclosed. The circuit arrangement comprises:

an antenna for converting electromagnetic radiation into an antenna voltage, an analogue circuit for demodulating of an information signal based on the antenna voltage, a digital circuit for processing of the information signal and being adapted to be supplied with power from the analogue circuit, a decoupling circuit, interconnected between the analogue circuit and the digital circuit, and a control circuit, adapted to monitor a parameter characterizing the field strength of an electromagnetic field surrounding the antenna and to adjust an input current of the decoupling circuit based on the monitored parameter.

By monitoring the field strength in an area surrounding the antenna and controlling the input current of the decoupling circuit based on the monitored parameter, the circuit arrangement can be adapted to changing operating conditions, in particular for operating at changing distances from a reading device.

According to a preferred embodiment, the control circuit comprises a control output for outputting a control signal, the control signal being adapted to activate an energy saving state of the digital circuit.

In order to keep the input current of the decoupling circuit constant even in unfavorable operating conditions, the control circuit can activate an energy saving state of the digital circuit using a control output.

According to a further improved embodiment of the second aspect, the control output is connected to a clock generator adapted to provide a clock signal to the digital circuit, and the control circuit is adapted to reduce the clock rate of a clock signal supplied by the clock generator.

By reducing the clock rate of a clock signal supplied by the clock generator, the current input of the digital circuit can be reduced in unfavorable operating conditions.

According to a further preferred embodiment, the analogue circuit is adapted to perform a load modulation, and an impedance of the analogue circuit can be controlled by a load modulator independently from the power supply to the digital circuit.

By decoupling the digital circuit from the analogue circuit, a load modulation performed by the analogue circuit is not disturbed by the current input of the digital circuit. A load modulation for exchanging data between a chip card and a reading device is particularly used in so-called proximity RFID systems.

According to a further advantageous embodiment, the decoupling circuit comprises a first control input adjusted to receive a first control signal adapted to control the constant current drawn from the analogue circuit by the decoupling circuit.

Using the first control input, the decoupling circuit can be adapted to further components and operating conditions of the circuit arrangement, respectively.

According to a further advantageous embodiment of the present invention, the decoupling circuit comprises a voltage output for providing a supply voltage to the digital circuit and a second control input adjusted to receive a second control signal adapted to control the supply voltage provided at the voltage output.

By providing a second control input and a second control signal, the output voltage of the decoupling device can be adjusted for providing a required supply voltage to the digital circuit.

According to further aspects of the present invention, an RFID chip card device comprising a circuit arrangement for wirelessly exchanging data with a reader device in accordance with the first or second aspect is disclosed. By providing an RFID chip card device in accordance with embodiments of the present invention, the RFID chip card device can be used in a variety of operating conditions.

Before detailing the different embodiments in accordance with the present invention, at first, a contactless data transmission system according to the prior art will be described in order to make clear the way such systems operate.

FIG. 9 shows a data transmission system 900 comprising a contactless reader device 910 and a contactless chip card device 920. The contactless reader device 910 comprises a transmitter antenna 911, adapted to transmit electromagnetic radiation.

The contactless chip card device 920 comprises an antenna 921, an analogue circuit 922, and a digital circuit 923. The analogue circuit 922 is connected with the antenna 921, such that an antenna voltage $V_{AB}$ induced in the antenna 921 is fed into the analogue circuit 922.

In order to tune the contactless chip card device 920 for exchanging data using an information signal with the contactless reader device 910, the analogue circuit 922 comprises a tuning capacitor 924. The demodulation of the information signal is performed by a demodulator 925, whose configuration depends on the modulation scheme used.

The antenna voltage $V_{AB}$ provided by the antenna 921 is also used for supplying the digital circuit 923 with an operating current. For this reason, at least a part $I_{LOAD}$ of an antenna current $I_{AB}$ is fed from a central node 926 to a power supply circuit 927. The power supply circuit 927 is connected between the central node 926 and the digital circuit 923.

In the schematic diagram shown in FIG. 9, the power supply circuit 927 comprises a rectifier 928, a first capacitor 929 for smoothing a high-frequency input voltage, a serial voltage regulator 930, and a second capacitor 931 for smoothing and buffering an operating voltage $V_{DD}$ for supplying the digital circuit 923.

In addition, the analogue circuit 922 comprises a shunt 932, which drains a surplus current $I_{SHUNT}$ from the central node 926 over the shunt 932 in case of particular powerful electromagnetic fields in an area surrounding the antenna 921. In addition, the shunt 932 serves in a so-called "fast mode" to at least partially adapt the analogue circuit 922 to the current $I_{LOAD}$. In this way, an overload of the power supply circuit 927 and the demodulator 925, respectively, can be avoided, for example if the contactless chip card device 920 is brought into the close vicinity of the contactless reader device 910.

The data transmission system 900 may be a so-called "proximity" or near-field RFID system, in which data is exchanged using inductive coupling between the transmitter antenna 911 of the contactless reader device 910, also called "proximity coupling device" (PCD), and the antenna 921 of the contactless chip card device 920, also called "proximity integrated circuit card" (PICC). Near-field data transmission systems are useful for transmitting data up to a distance corresponding to 0.16 times of the wavelength of the carrier frequency. For example, using a carrier frequency of 13.56 MHz, an inductive coupling over a distance of several centimeters is possible.

The chip card device 920 can be operated in three different operating modes: a data processing mode, a waiting or data reception mode, or a data transmission mode. Of course, data can also be processed in parallel to a reception or transmission of data. In a so-called Type A data transmission according to ISO standard 14443, an amplitude modulation scheme is used for data transmission from the reader device 910 to the chip card device 920.

In the opposite direction, i.e. for a data transmission from the chip card device 920 to the reader device 910, a load modulation scheme with an auxiliary carrier frequency of 847 kHz is used. Typically, a reader device 910 offers an input bandwidth of roughly 1-2 MHz. The use of a load modulation scheme has the advantage that the chip card device 920 is not required to act as an active sender, but can transmit data back to the reading device 920 solely by changing the impedance of its antenna 921. For this purpose, a load modulator 933 is provided, which can be controlled by the digital circuit 923 by adding an additional load and which modifies the impedance $Z_{IN}$ of the analogue circuit 922 observed by the reader device 910. Alternatively, a modulation may also be effected by the shunt 932.

Because the load modulator 933 and the power supply circuit 927 for supplying power to the digital circuit 923 are connected in parallel by the central node 926, the power supply circuit 927 forms an additional load, which will also influence the impedance $Z_{IN}$ of the analogue circuit 922.

If the current uptake of the digital circuit 923 changes fast with respect to the duration of a symbol duration of the information signal, for example within 1 ms, because complex operations are performed by a microprocessor integrated into the digital circuit 923, disturbances in the data transmission between the contactless reader device 910 and the contactless chip card device 920 may occur. Such problems may occur in transmission mode as well as in reception mode of the contactless chip card device 920. A smoothing of the supply voltage $V_{DD}$ through the capacitors 929 and 931 on their own will not suffice to remedy these disturbances, because their charging or discharging currents are relatively large due to their low time constant, thus causing high frequency disturbances of their own.

Consequently, a high-frequency information signal, for example an amplitude modulated information signal with a carrier frequency of 13.56 MHz, may effectively be folded by changes of the load current $I_{LOAD}$ of a processor, operating, for example, with a clock rate of 1 MHz. Due to this folding disturbance signals are created, which may prevent a demodulation of the information signal by the demodulator 925. Inversely, the changes of impedance caused by the digital circuit 923 will overlay the load modulation signal caused by the load modulator 933 of the analogue circuit 923, such that a data transmission back to the contactless reader device 910 will also be disturbed. In addition, load changes in the data processing mode inducing a change of the impedance in the antenna 911 of the reader device 910, may be mistaken as an attempt of the chip card device 920 to transmit data, leading to further errors in due cause. For example, it may result in a request to retransmit supposedly erroneously received data by the reader device 910.

FIG. 1 shows a first embodiment of an improved circuit arrangement for transmitting data in a contactless data transmission system. In FIG. 1, a circuit arrangement 100 comprising solely the analogue circuit 120 and an antenna 921 is shown. Further parts of the data transmission system not shown may correspond, for example, to equivalent parts of the data transmission system 900 shown in FIG. 9 and described above.

As before, the antenna 921 is connected to the analogue circuit 120 via a tuning capacitor 924. Parts of the antenna current $I_{AB}$ provided by the antenna 921 are provided to a demodulator 921 or a load modulator 923, respectively, a power supply circuit 130 and a modified shunt 133 via the central node 926.

The power supply circuit 130 comprises a rectifier 921, a first capacitor 929, a voltage regulator 930, and a second capacitor 931. In addition, the power supply circuit 130 comprises a decoupling circuit 131 and a third capacitor 132. The decoupling circuit 131 exhibits a constant input impedance for different output currents $I_{OUT}$. The output voltage $V_{OUT}$ provided by the decoupling circuit 131 is smoothed by the third capacitor 132 and is buffered for supplying the voltage regulator 930.

Because changes in the supply current $I_{DD}$ are absorbed by the decoupling circuit 131, the shunt 133 does not need to compensate them anymore and can be set to adjust more slowly using a larger time constant.

FIG. 2 shows a schematic diagram of the input and output parameters of the decoupling circuit 131. The decoupling circuit 131 comprises a voltage input 200, used to feed a rectified but still high-frequency input voltage $V_{IN}$ to the decoupling circuit 131. The decoupling circuit 131 comprises a constant input current $I_{IN}$, such that for a given input voltage $V_{IN}$ at the voltage input 200, the input impedance of the decoupling circuit 131 remains constant, too. Because the mean voltage at the voltage input 200 is kept constant by the shunt 133, the decoupling circuit 131 constitutes a constant load.

In addition, the decoupling circuit 131 comprises a voltage output 201. The output voltage $V_{OUT}$ at the voltage output 201 is mainly constant, even if the load, in particular the digital circuit 923, draws a rapidly changing output current $I_{OUT}$.

Additionally, the decoupling circuit 131 comprises a first control input 202 and a second control input 203. The first control input 202 serves for adjustment of the constant input current $I_{IN}$ at the voltage input 200. The second control input 203 serves for adjusting the constant output voltage $V_{OUT}$ at the voltage output 201. Corresponding control signals may be provided either by reference voltages or currents of the analogue circuit 922 or using appropriate registers of the digital circuit 923.

FIG. 3 shows an exemplary circuit design in accordance with a first embodiment of the decoupling circuit 131. The input voltage $V_{IN}$ of the voltage input 200 is smoothed using the input capacitor 300. A constant current intake $I_{IN}$ from the voltage input 200 is effected by means of an adjustable current source 301. For this purpose, the adjustable current source 301 is connected with the first control input 202.

Behind the adjustable current source 301, an adjustable breakdown or Zener diode (Z-diode) is connected between the voltage output 201 and a ground potential 303. The output voltage at the voltage output 201 is kept constant using the adjustable Z-diode 302. At the same time, the current of the adjustable current source 301, which is not consumed by the digital circuit 923 connected to the voltage output 201, flows via the adjustable Z-diode 302 to the ground potential 303.

Instead of the Z-diode, a self-regulating transistor may be used, for example a PMOS transistor. In this case, the source terminal will be connected with the output potential $V_{OUT}$, the drain terminal will be connected with a predefined potential $V_{SS}$, for example the ground potential 303, and the gate terminal will be connected with the second control input 203 of potential $V_{OUT\ ADJUST}$.

In addition, the decoupling circuit 133 comprises an output capacitor 304, which further smoothes the output voltage $V_{OUT}$ provided by the voltage output 201. The capacitors 300 and 304 may correspond to the capacitors 929 and 132 of the power supply circuit 130 or may be additional capacitors of the decoupling circuit 131.

In the embodiment described, the output voltage $V_{OUT}$ of the voltage output 201 is supplied to the voltage regulator 930 in order to adapt the provided output voltage $V_{OUT}$ to the supply voltage $V_{DD}$ required by the digital circuit 923. Depending on the concrete embodiment of the power supply circuit 130, the voltage regulator 930 may also be part of the decoupling circuit 131. For example, the output voltage $V_{OUT}$ at the voltage output 201 may be adjusted by means of the second control input 203 using the Z-diode 302.

In order to ensure an undisturbed data transmission between the reader device 910 and the contactless chip card device 920, the control input 202 adjusts the current source 301 in such a way that the input current $I_{IN}$ accepted by it is always larger than the maximum of the output current $I_{OUT}$ required by the digital circuit 923. In order to keep the input current $I_{IN}$ of the decoupling circuit 131 constant at the same time, the path via the adjustable Z-diode 302 to the ground potential 302 connected in parallel to the voltage regulator 930 is adjusted in such a way that the sum of the current flowing over these two parallel paths remains constant in all conditions.

In this way, high-frequent current changes of the output current $I_{OUT}$ of the decoupling circuit 131 are not transferred to the voltage input 200, as long as the input current $I_{IN}$ remains smaller than the average output voltage $I_{OUT}$ and the current $I_{IN\_ADJUST}$ adjusted by means of the first control input 202 is smaller than the current $I_{AB}$ supplied by the antenna 921. Henceforth, a change of impedance of the antenna 921 is only controlled by the load modulator 933, such that a data transmission between the contactless reader device 910 and the contactless chip card device 920 can be ensured to be free of disturbances. In addition, an improvement of the signal-to-noise ratio (SNR) of the transmission channel is effected by means of the decoupling.

Only in an operating range, in which no sufficiently high antenna voltage $V_{AB}$ can be provided from the antenna 921 in order to provide the input current $I_{IN}$ required by the decoupling circuit 131, a coupling between the digital circuit 923 and the analogue circuit 922 occurs. In this case, the decoupling circuit 131 provides a low impedance connection between the voltage input 200 and the voltage output 201 because the adjustable Z-diode 302 cuts off in these circumstances and no current flows to the ground potential 303.

FIG. 5 shows a second embodiment of a circuit arrangement 500. The circuit arrangement 500 differs from the circuit arrangement 100 in that an adjustable shunt 501 is provided, whose conductivity or, respectively, whose internal impedance can be influenced by a demodulator 502. In particular, the shunt 501 can be operated in a so-called "hold" operating mode and a so-called "slow" operating mode.

Usually, the shunt 501 is operated in the "slow" operating mode. In this operating mode, its conductivity slowly follows the antenna voltage $V_{AB}$ of the central node 926 and, in due course, the field strength in the area of the antenna 921. The stronger the field in the area of the antenna 921, the more current will be shunted via the shunt 501, such that the voltage $V_{AB}$ at a central node 926 does not reach dangerously high values.

In the "hold" operating mode, this adaptation of the conductivity is prevented, however. For this to take place, the demodulator 502 provides an appropriate control signal using a control line 503. For example, a field effect transistor (FET) used as adjustable shunt 501 can be adjusted to a fixed value by providing a suitable control voltage.

As already described, a data transmission from the contactless reader device 910 to the contactless chip card device 920 may takes place using the so-called Type A transfer mode of the radio transmission standard ISO 14443 by modulating a carrier signal using amplitude modulation. According to the standard, the degree of modulation is 100%, meaning that the modulated carrier signal comprises blanking intervals of several microseconds length, also called Type A gaps, whose position determines an information signal based on modified Miller coding.

Figure 4A:
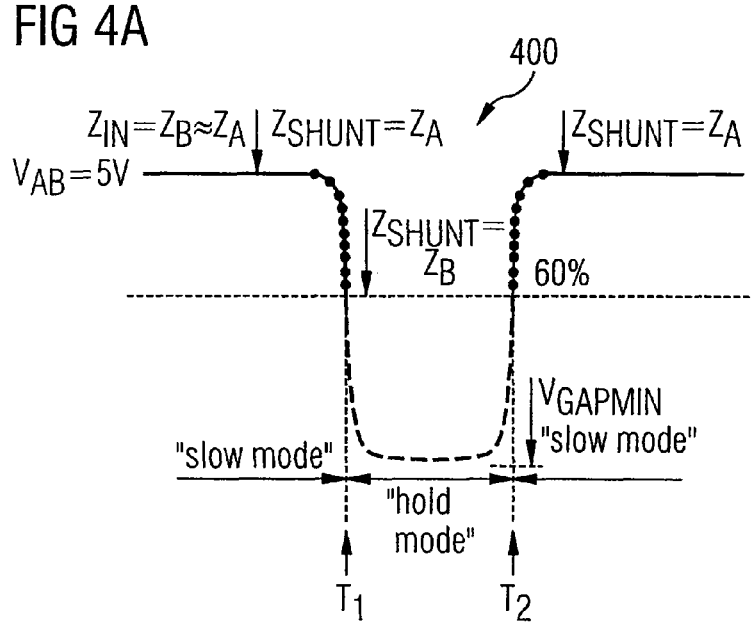
FIG. 4A shows an antenna voltage during reception of a gap.

The voltage of the antenna voltage $V_{AB}$ during transmission of a gap 400 is represented in FIG. 4A. At the start of the gap 400 the antenna voltage $V_{AB}$ drops steeply. The shunt 501 is adapted to keep the voltage at the central node 926 at a target level, for example 5 V. As a reaction to the drop of the antenna voltage $V_{AB}$, the impedance of the shunt 501 is increased slowly. This increasing of the impedance of the shunt 501 counteracts the voltage drop at the central node 926 during the reception of the gap 400 and thus interferes with the demodulator 502. In order to ensure a demodulation nonetheless, according to the second exemplary embodiment, the shunt 501 is switched into the "hold" operating mode if a drop below 60% of the initial voltage is detected at time $T_1$, such that the impedance of the shunt 501 remains constant. In this way, the voltage at the central node 926 drops further at a fast rate and allows a safe detection by the demodulator 502. Only at the end of the gap 400 at time $T_2$, when the antenna voltage $V_{AB}$ rises above the predefined threshold value of 60%, the shunt 501 is switched back to the normal "slow" operating mode such that it can be adapted slowly to changes of the antenna voltage $V_{AB}$. Changes of the impedance of the shunt 501 which are slow with respect to the duration of the symbol length of the information signal do not disturb the demodulator 502.

However, by including the additional decoupling circuit 131, the shape of the received gap will be slightly disturbed. Such a disturbed gap 410 is shown in FIG. 4B.

As described above, the current $I_{IN}$ through the decoupling circuit 131 is reduced in an area of particularly low antenna voltage $V_{AB}$ considerably, such that the input impedance increases with decreasing input voltage $V_{IN}$ of the decoupling circuit 131. At the same time, the internal impedance of the shunt 501 increases, such that, by superposition of both effects, the impedance $Z_{IN}$ observed at the central node 926 increases considerably. In consequence, the voltage drop of the gap 410 is reduced considerably and the demodulator 502 detects the existence of the disturbed gap 410 late or not at all.

FIG. 6 shows a third embodiment of a circuit arrangement 600 for improved data transmission. According to the embodiment, a feedback circuit 610 is provided, which connects the decoupling circuit 131 with the adjustable shunt 501. By means of the feedback circuit 610, a part of the current flowing through the decoupling circuit 131 is fed back to the shunt 502, such that the internal impedance of the shunt 502 does not drop during the reception of a gap 400, such that the gap 400 is not flattened.

FIG. 4C shows the transmission of the difference current dI from the decoupling circuit 131 to the shunt 502 during the reception of a gap 400. The upper part of FIG. 4C shows the field strength in an area of the antenna 921 during the transmission of the gap 400 of an information signal. In the middle and in the lower part of FIG. 4C the current flow $I_{DEC}$ through the decoupling circuit 131 and the current flow $I_{SHUNT}$ through the shunt 501, respectively, are shown.

While the mean current $I_{DEC\_SLOW}$ through the decoupling circuit 131 remains practically constant during the relatively short gap 400, the instantaneous current flow $I_{DEC}$ collapses.

The difference current dI will either be provided to the shunt 501 directly or be used to control it. For example, the difference current dI can be mirrored to the shunt 501 using a current mirror.

The relatively large current flow $I_{SHUNT\_RES}$ through the shunt 501 prevents that, in the case of a gap 400, the current through the shunt 501 does not decrease or, at least, does not decrease rapidly, such that the internal impedance of the shunt 501 is not increased. In due course, this causes a rapid voltage drop at the central node 926, such that the gap 400 can be safely detected by the demodulator 502.

In addition to the components according to the embodiment shown in FIGS. 1 and 5, the circuit arrangement 600 comprises the feedback circuit 610, which, for the purpose described, feeds back the detected difference current dI to the shunt element 501. The feedback circuit 610 comprises a low pass filter 611 and a comparator 612. By subtracting an input current $I_{IN}$ divided by the factor N, shown as $I_{IN}/N$ in FIG. 6, from the mean current $I_{SLOW}$ generated by means of the low pass filter 611, the comparator 612 can compute the change of the current dI through the decoupling circuit 131.

Figure 7:
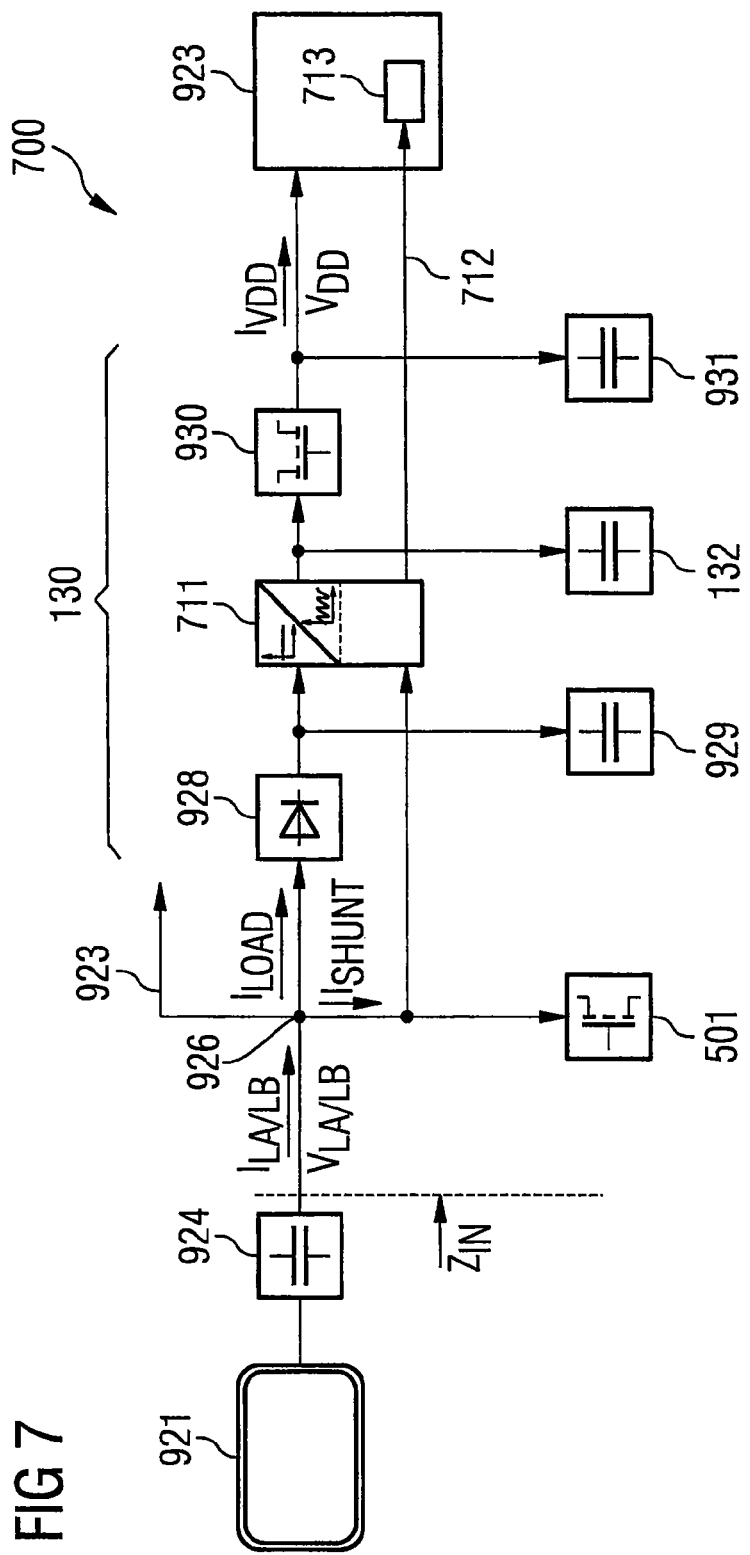
FIG. 7 shows a schematic diagram in accordance with a fourth embodiment of the circuit arrangement.

FIG. 7 shows a fourth embodiment of the circuit arrangement 700 for data transmission. With respect to the first embodiment according to FIG. 1, the circuit arrangement 700 comprises a decoupling circuit 710 with an integrated control circuit 711.

The control circuit 711 serves the purpose of adapting the constant input current $I_{IN}$ of the decoupling circuit 710 to the current operating conditions of the contactless chip card device 920. As described above, the antenna voltage $V_{AB}$ and, consequently, the current through the central node 926 decreased considerably with increasing distance between the contactless chip card device 920 and the contactless reader device 910. For example, the magnetic field strength may be 8 A/m immediately at the transmission antenna 911, while it may be reduced to 0.5 A/m in 18 cm distance. Correspondingly, the antenna current $I_{AB}$ is reduced from roughly 100 mA to only a few mA.

In order to ensure a correct functioning of the contactless chip card device 920 regardless, the input current $I_{IN}$ of the decoupling circuit 710 according to the fourth embodiment of the circuit arrangement 700 can be adapted to the available current $I_{AB}$. For example, the current uptake can be influenced via the first control input 201 or using a value, which is stored in a so-called special function register (SFR) of the chip card device 920.

In order to effect an adjustment of the circuit arrangement 700 to differing operating conditions, the control circuit 711 controls the input current $I_{IN}$ of the decoupling circuit 710, such that, in cases of low field strengths in the area of the antenna 921, only a low constant current is drawn by the decoupling circuit 710 from the central node 926. However, in cases of high field strengths in the area of the antenna 921, a larger current is drawn from the central node 926. For this purpose, the control circuit 711 monitors the current through the shunt 501. A large current flowing through the shunt 501 indicates a strong field in the area of the antenna 921, while a small or no current flowing through the shunt 501 indicates a low field strength.

In areas in which the antenna voltage $V_{AB}$ induced into the antenna 921 is particularly low, for example in cases in which the output current $I_{OUT}$ is larger than 90% of the input current $I_{IN}$, the digital circuit 923, which is supplied with an operating voltage $V_{DD}$ by the current supply circuit 130, can be switched into an energy saving state by means of a control output 712 of the control circuit 711. In this energy saving state, the digital circuit 923 draws less current, such that, even in cases of a reduced input current $I_{IN}$ to the decoupling circuit 701, a decoupling of the digital circuit 923 from the analogue circuit 922 is ensured.

For example, a digital circuit 923 may comprise a clock generator 713, which may provide a reduced clock signal to the digital circuit 923 in the energy saving state. Consequently, further components of the digital circuit 923, for example, a processor used for encrypting or decrypting, will work with a lower speed and consequently consume less current. Alternatively, a further processing of data by the processor may be suspended until a sufficiently large input current $I_{IN}$ is available.

Figure 8:
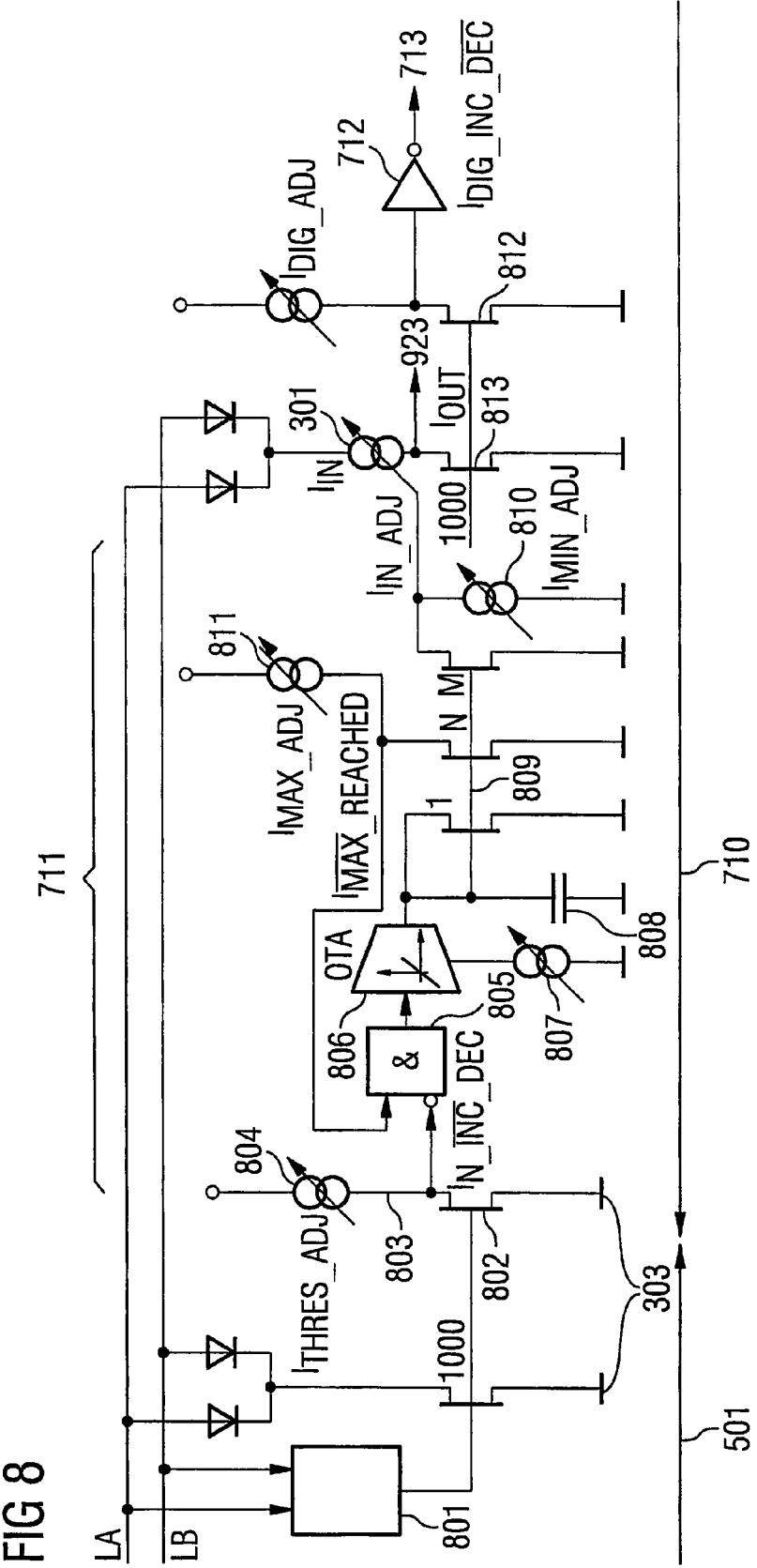
FIG. 8 shows a circuit design of the circuit arrangement according to the fourth embodiment.

FIG. 8 shows an exemplary circuit design for the circuit arrangement 700 in accordance with the fourth embodiment. An antenna voltage regulator 801 monitors the antenna voltage $V_{AB}$ of two antenna terminals LA and LB. Depending on the detected antenna voltage $V_{AB}$, which is characteristic for the electrical field strength in the area of the antenna 921, the shunt 501 is controlled in such a way that the voltage at the central node 926 is kept close to a set-point value, for example 5 V. For this purpose, the impedance of the adjustable shunt 501 is lowered in cases of particularly high antenna voltages $V_{AB}$ and increased in cases of lower antenna voltages $V_{AB}$ in order to shunt a correspondingly higher or lower current $I_{SHUNT}$ through the shunt 501 to the ground potential 303.

The current $I_{SHUNT}$ through the shunt 501 is mirrored by a transistor 802 with a ratio of 1000:1. A current comparator 803 compares the current mirrored by the transistor 802 with a reference current $V_{THRES\_ADJ}$ of a reference current source 804. If the mirrored current exceeds a predefined threshold value, the current comparator 803 generates a control signal for increasing the input current $I_{IN}$. The inverted output signal of the current comparator 804 is linked by means of a logical AND-gate 805 with a further control signal, which serves to limit the maximum input current $I_{MAX}$. The output of the AND gate 805 is connected with the input of an operational transconductance amplifier (OTA) 806. The time constant of the OTA 806 can be controlled using a control input 807 and should be selected to be large with respect to the typical signal or gap duration of roughly 1 ms.

The output current of the OTA 806 is used to load a capacitor 808, whose load level is mirrored by a further current comparator 809 and a current sink 810 in the ratio of 1:N:M, respectively. The adjustable current sink 810 is used for adjusting the minimal input current $I_{MIN\_ADJ}$ of the decoupling circuit 710. The current comparator 810 limits the input current $I_{IN}$ to the decoupling circuit 710 using a further adjustable current source 811 via the control signal $I_{MAX\_ADJ}$ to the maximum current $I_{MAX}$. In this way, damages to the adjustable current source 301 and the shunt transistor 813 configured as adjustable Z-diode 302 of the decoupling circuit 710 can be prevented. The control signal $E_{IMAX\_REACHED}$ generated by the current comparator 809 is fed back to the AND-gate 805 for this purpose, such that a further increase of the constant input current $I_{IN}$ is prevented in this case.

The output signal of the OTA 806 further serves as a control signal $I_{IN\_ADJ}$ for controlling the adjustable current source 301 and, in this way, determines the input current $I_{IN}$ of the decoupling circuit 710.

In order to ensure a decoupling of the digital circuit 923 from the analogue circuit 922 of the contactless chip card device 920, the control circuit 711 integrated into the decoupling circuit 710 provides an additional output signal $E_{DIG\_INC\_DEC}$ to the control output 712, which is used to control the clock generator 713, not shown in FIG. 8. By means of a corresponding control signal, the clock speed of the clock generator 711 is increased or decreased in accordance with the output current $I_{OUT}$. This is effected by means of a further current mirror 812 with a divider ratio of 1:1000, which is part of the decoupling circuit 710.

Although, in the exemplary embodiment shown in FIG. 8, the control circuit 711 is integrated into the decoupling circuit 710, there may be circuit arrangement 700 in which an external control circuit 711 controls a separate decoupling circuit 710, for example using a first control input 202. Alternatively, the control circuit 711 may be integrated with the antenna voltage regulator 801.

It is obvious to a person skilled in the art that the properties of the third and the fourth embodiment of the circuit arrangement may be combined with one another such that a combined circuit arrangement adapts the decoupling circuit 710 and the adjustable shunt 501.

In addition, the gist underlying the invention may be used in other circuit arrangements comprising an analogue circuit 922 and a digital circuit 923. In particular, so-called hybrid chip cards, which provide both, a contactless and a pin contact interface, can be improved by the use of a decoupling circuit in accordance with an embodiment of the invention.

What is claimed is:

1. A circuit arrangement for wirelessly exchanging data with a reader device, comprising:
   an antenna configured to convert electromagnetic radiation into an antenna voltage;
   an analogue circuit configured to demodulate an information signal based on the antenna voltage, the analogue circuit comprising an adjustable shunt;
   a digital circuit configured to process the information signal and receive power from the analogue circuit;
   a decoupling circuit interconnected between the analogue circuit and the digital circuit; and
   a feedback circuit, which is connected to the decoupling circuit and the adjustable shunt, configured to detect an amplitude modulation of the antenna voltage, wherein the feedback circuit controls the adjustable shunt in response to a detected modulation of the antenna voltage.

2. The circuit arrangement according to claim 1, wherein, in a predefined voltage range, the decoupling circuit draws a constant current from the analogue circuit independent from the power supplied to the digital circuit.

3. The circuit arrangement according to claim 2, wherein the decoupling circuit comprises a first control input for receiving a first control signal for controlling the constant current drawn from the analogue circuit by the decoupling circuit.

4. The circuit arrangement according to claim 3, wherein the decoupling circuit comprises an adjustable current source that is adjusted using the first control signal.

5. The circuit arrangement according to claim 2, wherein the analogue circuit is configured to perform a load modulation, and wherein an impedance of the analogue circuit is controllable by a load modulator independently from the power supplied to the digital circuit.

6. The circuit arrangement according to claim 1, wherein the decoupling circuit comprises a voltage output for providing a supply voltage to the digital circuit and a second control input for receiving a second control signal for controlling the supply voltage provided at the voltage output.

7. The circuit arrangement according to claim 6, wherein the decoupling circuit comprises an adjustable Zener-diode or a self-regulating transistor configured to control the supply voltage based on the second control signal.

8. The circuit arrangement according to claim 1, wherein the feedback circuit is configured to keep constant or decreasing decrease the impedance of the adjustable shunt when a gap is detected in the modulated antenna voltage.

9. A circuit arrangement for wirelessly exchanging data with a reader device, comprising:
   an antenna configured to convert electromagnetic radiation into an antenna voltage;
   an analogue circuit configured to demodulate an information signal based on the antenna voltage;
   a digital circuit configured to process the information signal and receive power from the analogue circuit;
   a decoupling circuit interconnected between the analogue circuit and the digital circuit; and
   a control circuit configured to monitor a parameter characterizing the field strength of an electromagnetic field surrounding the antenna and adjust an input current of the decoupling circuit based on the monitored parameter.

10. The circuit arrangement according to claim 9, wherein in a predefined voltage range, the decoupling circuit is configured to draw a constant current from the analogue circuit independent from the power supplied to the digital circuit.

11. The circuit arrangement according to claim 10, wherein the decoupling circuit comprises a first control input for receiving a first control signal for controlling the constant current drawn from the analogue circuit by the decoupling circuit.

12. The circuit arrangement according to claim 11, wherein the decoupling circuit comprises an adjustable current source that is adjusted using the first control signal.

13. The circuit arrangement according to claim 10, wherein the analogue circuit is configured to perform a load modulation, and wherein an impedance of the analogue circuit is controllable by a load modulator independently from the power supplied to the digital circuit.

14. The circuit arrangement according to claim 9, wherein the decoupling circuit comprises a voltage output for providing a supply voltage to the digital circuit and a second control input for receiving a second control signal for controlling the supply voltage provided at the voltage output.

15. The circuit arrangement according to claim 14, wherein the decoupling circuit comprises an adjustable Zener-diode or a self-regulating transistor configured to control the supply voltage based on the second control signal.

16. The circuit arrangement according to claim 9, wherein the control circuit comprises a control output for outputting a control signal for activating an energy saving state of the digital circuit.

17. The circuit arrangement according to claim 16, wherein the control output is connected to a clock generator configured to provide a clock signal to the digital circuit, and wherein the control signal is for reducing the clock rate of a clock signal supplied by the clock generator.

18. A circuit arrangement for wirelessly exchanging data with a reading means, comprising:
   a conversion means for converting electromagnetic radiation into an antenna voltage;
   a demodulation means for demodulating an information signal based on the antenna voltage;
   an adjustable shunting means for shunting a current caused by the antenna voltage;
   a processing means for processing of the information signal;
   an interconnection means for supplying power from the conversion means to the processing means and for decoupling the conversion means from the processing means; and a feedback means for detecting an amplitude modulation of the antenna voltage and for controlling the adjustable shunting means in response to a detected modulation of the antenna voltage.

19. A circuit arrangement for wirelessly exchanging data with a reading means, comprising:
  an conversion means for converting electromagnetic radiation into an antenna voltage;
  a demodulation means for demodulating an information signal based on the antenna voltage;
  a processing means for processing the information signal;
  an interconnection means for supplying power from the conversion means to the processing means and for decoupling the conversion means from the processing means; and
  a control means for monitoring a parameter characterizing the field strength of an electromagnetic field surrounding the conversion means and for adjusting an input current of the interconnection means based on the monitored parameter.

20. The circuit arrangement according to claim 19, further comprising a clock generation means for providing a clock signal to the processing means, wherein the control means controls a reduction of the clock rate of the clock signal supplied by the clock generation means.

21. An RFID chip card device for wirelessly exchanging data with a RFID reader device, comprising:
  an antenna configured to convert electromagnetic radiation into an antenna voltage;
  an analogue circuit configured to demodulate an information signal based on the antenna voltage, the analogue circuit comprising an adjustable shunt;
  a digital circuit configured to process the information signal and receive power from the analogue circuit;
  a decoupling circuit interconnected between the analogue circuit and the digital circuit; and
  a feedback circuit, which is connected to the decoupling circuit and the adjustable shunt, is configured to detect an amplitude modulation of the antenna voltage, wherein the feedback circuit is configured to control the adjustable shunt in response to a detected modulation of the antenna voltage.

22. The RFID chip card device according to claim 21, further comprising an adjustable current source that is adjustable using a first control signal controlling the constant current drawn from the analogue circuit by the decoupling circuit.

23. The RFID chip card device according to claim 21, wherein the feedback circuit is configured to keep constant or decrease the impedance of the adjustable shunt when a gap is detected in the modulated antenna voltage.

24. An RFID chip card device for wirelessly exchanging data with an RFID reader device, comprising:
  an antenna configured to convert electromagnetic radiation into an antenna voltage;
  an analogue circuit configured to demodulate an information signal based on the antenna voltage;
  a digital circuit configured to process the information signal and receive power from the analogue circuit;
  a decoupling circuit interconnected between the analogue circuit and the digital circuit; and
  a control circuit configured to monitor a parameter characterizing the field strength of an electromagnetic field surrounding the antenna and adjust an input current of the decoupling circuit based on the monitored parameter.

25. The RFID chip card device according to claim 24, further comprising a clock generator configured to provide a clock signal to the digital circuit, wherein the control circuit is configured to provide a control signal for reducing the clock rate of the provided clock signal to the clock generator.

* * * * *